Figure 9:
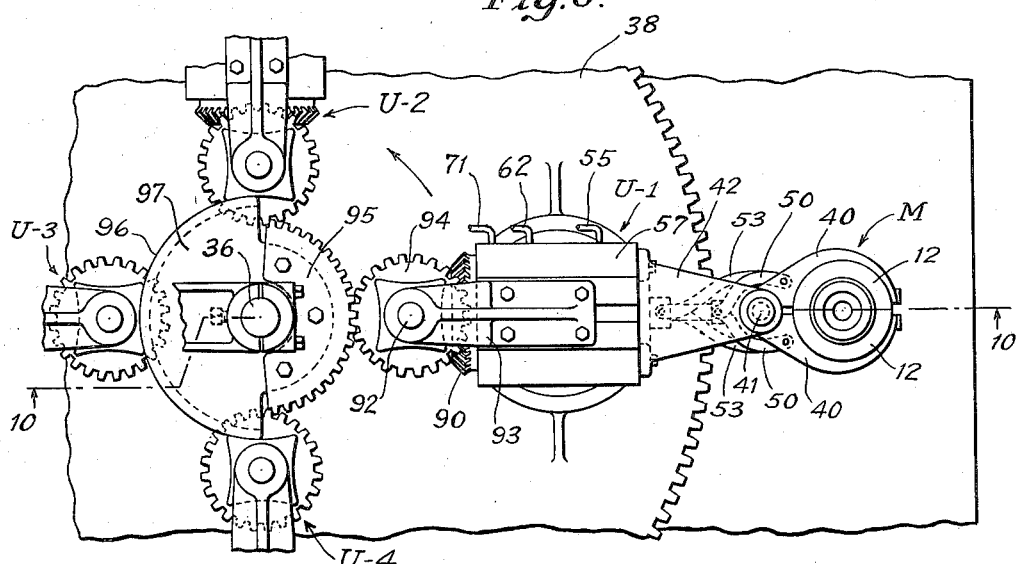

July 14, 1936.  L. G. BATES  2,047,173
METHOD OF AND APPARATUS FOR MANUFACTURING BOTTLES
AND SIMILAR ARTICLES OF HOLLOW GLASSWARE
Filed April 4, 1935   2 Sheets-Sheet 1
*Fig.1.*   *Fig.2.*   *Fig.3.*
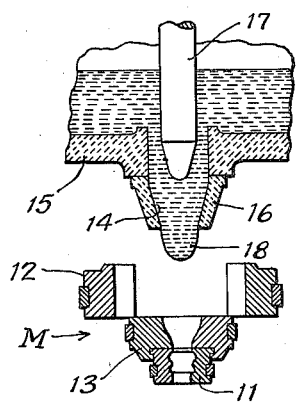 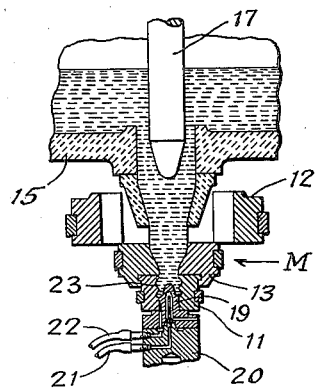 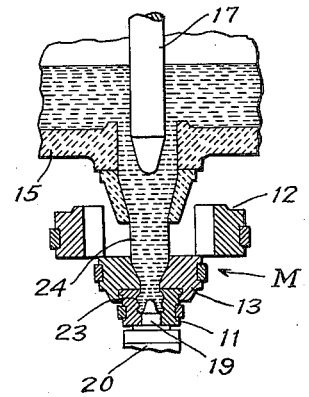
*Fig.4.*   *Fig.5.*
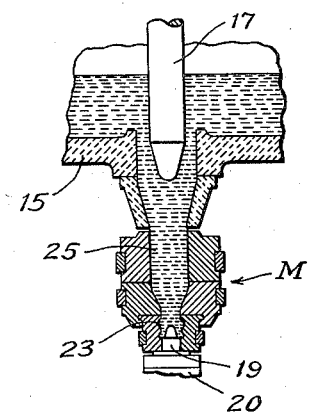 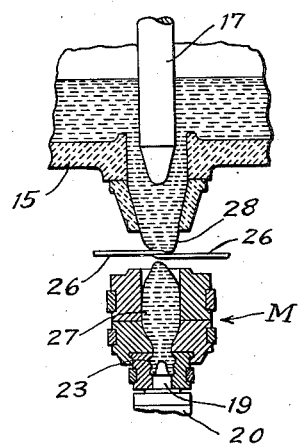
*Fig.6.*
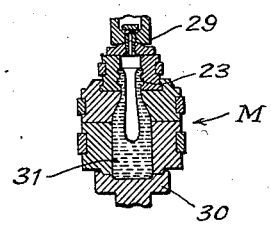
*Fig.7.*   *Fig.8.*
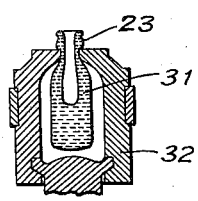 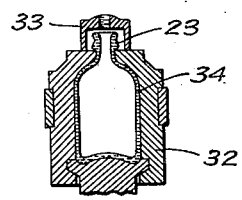
Witness:
A. A. Horn
Inventor:
Lloyd G. Bates
by Brown & Parham
Attorneys.

July 14, 1936.  L. G. BATES  2,047,173
METHOD OF AND APPARATUS FOR MANUFACTURING BOTTLES
AND SIMILAR ARTICLES OF HOLLOW GLASSWARE
Filed April 4, 1935    2 Sheets-Sheet 2

Inventor:
Lloyd G. Bates
by Brown & Parham
Attorneys.

Witness:
A. A. Horn

Patented July 14, 1936

2,047,173

UNITED STATES PATENT OFFICE 2,047,173

METHOD OF AND APPARATUS FOR MANUFACTURING BOTTLES AND SIMILAR ARTICLES OF HOLLOW GLASSWARE

Lloyd G. Bates, West Hartford, Conn., assignor to Hartford-Empire Company, Hartford, Conn., a corporation of Delaware Application April 4, 1935, Serial No. 14,672

14 Claims. (Cl. 49—5)

This invention relates to methods of and apparatus for manufacturing bottles and generally similar articles of hollow glassware and particularly to such methods and apparatus as involve the use of glass feeders by which charges are produced and delivered to parison forming molds of glassware forming machines.

More specifically described, the invention relates to such methods and apparatus as make provision for the charging of inverted parison molds beneath the discharge outlet of a glass feeder with glass charges which are received in the cavities of such molds while they are still connected with a supply stream or column of glass descending from the feeder outlet.

An object of the invention is to provide a novel, practicable method of loading the cavity of an inverted parison mold with glass of a supply stream from a feeder outlet without causing lapping, coiling or folding of the glass entering the mold cavity or harmful differential chilling or marring of different portions of the complete charge.

A further object of the invention is to provide a method of the character described by which an inverted parison mold beneath the discharge outlet of a glass feeding container may be charged with glass of a descending supply stream in such manner that the mold cavity will be loaded with a charge of glass that has been formed to fit the mold cavity without chilling contact of a mold wall or other instrumentality with the body or major portion of the charge and has been located in such cavity and in contact with the walls thereof while the charge is still connected with the supply stream.

A further object of the invention is to provide a novel combination of cooperative glass feeding and parison forming parts and operations for charging an inverted parison mold and forming a parison therein in an improved manner.

According to the present invention, glass of a descending stream or column that will comprise the lower end portion of a complete charge for an inverted parison mold is shaped and supported by walls of the lower end portion of the mold cavity, while the glass that will comprise the major portion or body of the charge is preformed without contact with walls of the mold or any other shaping instrumentality to fit the portion of the mold cavity for which the body of the charge is intended. Thereafter, the walls of the portion of the mold for which such preformed major portion or body of the charge is intended will be brought into contact and laterally supporting relation therewith and the complete charge in the inverted parison mold will be severed from the glass of the supply stream or column.

The complete charge thus is formed to fit the cavity of the inverted parison mold and is located in the parison mold in contact with the walls of the mold cavity without any possibility of lapping, coiling or folding of the glass of any portion of the charge or marring of the surface of any portion of the charge by reason of sliding contact with a wall of the mold cavity. Moreover, the portion of the mold charge that is first shaped and chilled by contact with walls of the mold cavity is that which, in the formation of a parison for a bottle or like article, will comprise the neck portion of the parison and of the article to be made. Such neck portion may be given its final external configuration and shape in the parison mold and it therefore may be of advantage to chill the glass thereof longer than the glass of the major portion or body of the charge, substantial expansion of which is required for the production of the body of the finally formed article.

Other objects of the invention and advantages thereof will hereinafter be pointed out or will become apparent from the following description of a series of steps for the production of a bottle by the method of the present invention and by the use of a particular arrangement of cooperative structural element, as shown in the accompanying drawings, in which, Figures 1 to 8, inclusive, are fragmentary, vertical sectional views, illustrating various stages in the manufacture of a bottle by the method of the invention, certain of these views showing special cooperative structural parts and arrangements thereof for use in the performance of such method, and Figs. 9 and 10, respectively, are a fragmentary plan view and a fragmentary vertical sectional view of a glassware forming machine embodying structural features of the invention and adapted for the performance of the method thereof, Fig. 10 also showing a portion of the feeder with which the forming machine is associated.

For the production of a narrow-neck article of glassware, such as the bottle shown in Fig. 8, I may provide and make use of a parison mold M, Figs. 1 to 6, inclusive, 9 and 10, comprising a two-part neck ring 11 and a body mold that is divided horizontally into a two-part upper main section 12 and a two-part lower, shorter section 13. The line of division between the sections 12 and 13 of the parison body mold preferably is at a plane approximating that at which the body of the cavity of the inverted parison mold starts to taper to the diameter of the neck ring.

Since the diameter of the neck ring of the particular parison mold shown in the drawings is relatively small at its upper end as compared with the diameter of the main portion of the cavity of the mold body, it is desirable to divide the parison body mold horizontally as just described, so that the lower section may be closed with the neck ring for the purpose of supporting and shaping glass of the lower end portion of a descending stream or column of glass of a diameter at the overhead feeder outlet approximating that of the cavity of the main portion of the parison body mold. When the neck ring has a greater relative inner diameter at its upper end and the cavity thereof is of sufficient depth to afford the desired support for the glass of the lower end portion of a descending stream or column of glass of substantial cross-sectional area during the pre-shaping of a laterally unsupported further portion of such stream or column to form the major portion or body of the charge, then the parison body mold need not be divided horizontally but may be of the usual two-part construction.

In carrying out the invention with the use of a mold M as above described, such mold may be brought to a position below and in line with a discharge outlet 14 in the bottom of a glass feeding container 15. The outlet structure may be such as to project downwardly from the bottom of the container 15 in the form of a tubular spout or nozzle 16. This will permit the open halves of the main section of the parison mold body to overlap the outlet structure when the parison mold has been raised toward the outlet for a purpose to be presently pointed out. While this construction is preferred, it hereinafter will become apparent that the lower end of the outlet need not project downwardly from the container bottom, as shown, unless the distance from the lower end of the outlet to the supporting surface within the cavity of the closed halves of the lower portion of the raised mold is too great to permit the lower end of the stream or column of glass descending from the outlet to reach such supporting surface before any portion of such stream or column becomes substantially attenuated or starts to break out of control. This condition may exist when the cavity of the mold to be charged is relatively long.

Except as above indicated, the container and its outlet may be constructed in any suitable known manner and of any suitable known materials.

Glass may be supplied thereto in any convenient way, as by constructing the container as a forehearth or extension of a glass melting tank (not shown). The arrangement should be such that a supply body of glass of suitable temperature, viscosity and condition and of substantial depth will continuously submerge the outlet.

A normally stationary vertical refractory implement 17 may be employed to regulate gravity discharge of glass from the outlet. This implement may be mounted in any suitable known manner for vertical adjustment with relation to the outlet or may be reciprocated vertically should it be desired to apply flow accelerating and/or retarding impulses to the glass at the outlet.

Assuming that the implement 17 is stationary and that a stream or column 18 of glass is descending from the outlet under gravity and head pressure, the mold M may be raised vertically from the position shown in Fig. 1 until the lower end portion of such stream or column is disposed within and supported by the walls of the cavity of the closed neck ring 11 and lower section 13 of the parison body mold.

A neck pin 19 may have been projected upwardly into the neck ring, as by means of a vertically movable carrier 20, Figs. 2 to 5, inclusive and 10. The neck pin and its carrier may be suitably constructed to permit internal cooling of the neck pin, as by cooling fluid supplied by the conduit 21.

Suction may be caused in the space between the tip of the neck pin and the walls of the neck ring, as by connecting such space with a conduit 22 adapted for connection with any suitable exhaust mechanism (not shown). Suction thus may be employed to facilitate and aid in drawing glass from the lower end portion of the supply stream downwardly around the neck pin to form the neck finish portion 23 of a glass parison, as shown in Fig. 2, while the portion of the charge that will comprise the major portion or body of such parison is yet unformed or only partially formed.

After the stage of operations shown in Fig. 2, the mold M may be lowered at a speed predetermined with relation to the rate of issuance of glass from the outlet so that the portion of the glass column between the open halves of the section 12 of the parison body mold will be preformed to fit the cavity of such section when the halves thereof are closed. Such portion of the glass stream or column during the formation thereof and before closing of the halves of the section 12 is indicated at 24 in Fig. 3 and, after the closing of such section, at 25 in Fig. 4.

After the closing of the halves of the section 12, the mold M and the glass therein are given a further downward movement, preferably at a higher speed, to attenuate the glass between the charge in the mold and the glass at the outlet. Shear blades 26 may be closed to cut through this connecting glass, as indicated in Fig. 5, separating the glass charge 27 in the closed mold from the stub 28 that constitutes the lower end portion of the stream or column of glass for charging the succeeding parison mold.

The suction in the neck ring, hereinbefore referred to, may be discontinued after the formation of the neck finish portion of the glass parison or continued during the downward movement of the mold and the completion of the mold charging operation.

After the stage of operations shown in Fig. 5, the neck pin carrier 20 may be moved downward to withdraw the neck pin from the neck ring. The closed parison mold with the glass therein then may be moved laterally.

The glass in the mold may be compacted or settled by settle blowing pressure applied to the upper surface thereof by any suitable known means, although, in view of the hereinbefore described method of charging the mold, settle blowing of the glass therein may be dispensed with as the neck finish portion of the parison will already have been formed and located in the neck ring and the glass of practically the entire body of the charge also will have been caused to contact firmly and uniformly with the walls of the parison body mold cavity.

As the charged mold is moved laterally from the position shown in Fig. 5, an uncharged parison mold may be brought to that position and a new cycle of mold charging operations commenced.

During the lateral movement of the charged mold M, it may be reverted and at a suitable station along its path of movement or at a suitable place during such movement a counterblow head 29 and a bottom plate or baffle 30, respectively, may be applied to the upper and lower ends of the mold and counterblowing of the glass therein effected to produce a hollow parison 31, Fig. 6. Subsequently, this hollow parison may be transferred by any suitable known means, as by the neck ring of the parison mold, to a final blow mold 32, Fig. 7. A final blow head 33 may be applied to such blow mold and the hollow parison therein may be expanded by blowing pressure against the walls of the blow mold cavity, to form the final article, which, in the operation just described, may be a bottle as shown at 34 in Fig. 7.

Figure 10:
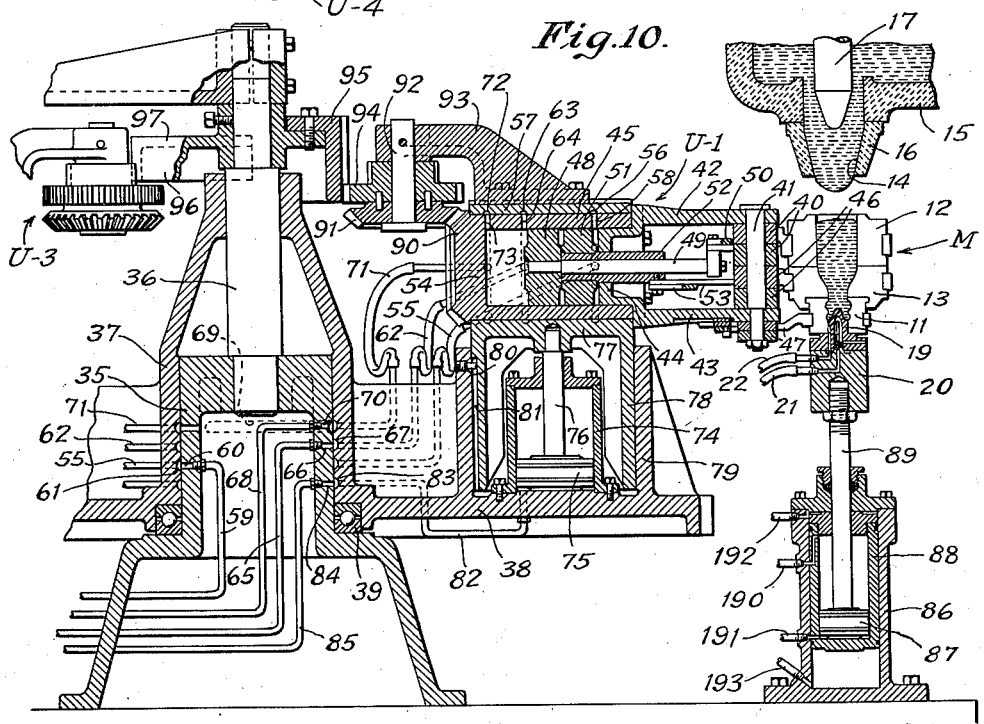

A glassware forming machine having mechanism for supporting and operating each of a plurality of the parison molds to effect the charging thereof in the manner above described is partially shown in Figs. 9 and 10, only such parts as are particularly concerned with the mold charging operations being illustrated as the construction and operation of all other parts and associate equipment as may be required in the operation of a complete bottle forming machine may be readily supplied by those skilled in the art and therefore need not be illustrated or more particularly specified herein.

As shown, the glassware forming machine has a central supporting column comprising an upright hollow shouldered base 35 surmounted by a stationary post 36. The hub 37 of a rotary table or turret 38 is rotatably supported on the supporting column, preferably to turn anti-frictionally, as on the bearings indicated at 39.

A plurality of angularly spaced parison forming units, shown as four in number and respectively indicated at U—1, U—2, U—3 and U—4, are carried by the table or turret 38. These units are alike and therefore the description and illustration of parts of the unit U—1 will suffice for an understanding of each of the other units.

The unit U—1 comprises a parison mold M, heretofore described. As shown, particularly in Fig. 10, this mold is disposed in inverted position at the mold charging station beneath the outlet 14 of the glass feeding container 15.

For operating the halves of the sections of the mold M, substantially as hereinbefore described, mechanism as shown and of the following description may be employed. Such mechanism includes carriers 40 for the halves of the upper section 12 of the mold. These carriers are mounted on a vertical pivot pin 41 which is supported by spaced bracket arm extensions 42 and 43, respectively, of an outer head 44 of a horizontally disposed radial cylinder 45. Also pivotally supported on this same pivot pin 41 are carriers 46 for the halves of the lower section 13 of the parison mold body and carriers 47 for the halves of the neck ring 11. The halves of the lower section 13 of the parison mold body overlap the halves of the neck ring, as is customary, so that closing of the former will effect closing of the latter.

For opening the halves of the neck ring at a station at which the parison supported thereby is to be transferred to a blow mold on an associate blow mold table (not shown) any suitable known means may be employed, such, for example, as that ordinarily used in the operation of two-table forming machines of the well-known Lynch type.

For closing the halves of the respective sections of the parison body mold at different times and independently of each other and for opening such sections independently of the neck ring, pneumatic mechanism, as shown, may be employed. Such pneumatic mechanism includes the aforesaid cylinder 45, an inner piston 48 connected by its rod 49 and pivoted links 50 with the pivoted carriers 40, and an outer piston 51 having a hollow rod 52 surrounding the rod 49 and connected by pivoted links 53 with the pivoted carriers 46. When both pistons 48 and 51 are at their retracted positions, viz, at the ends of their strokes toward the inner head 54 of the cylinder 45, the halves of both sections of the parison body mold will be fully open. Movement of the pistons 48 and 51 from the positions shown in Figs. 9 and 10 to such retracted positions may be effected by admitting air under pressure to the cylinder 45 between the outer piston 51 and the outer head of the cylinder, as through an air conduit 55, an internal groove 56 in the wall of a cylindrical bearing 57 in which the cylinder 45 is journalled, and a port 58 through the walls of the cylinder 45. This may take place when the parison forming unit approaches or reaches the parison transfer station, indicated by the position of the unit U—3 in Figs. 9 and 10, air at that time being supplied to the conduit 55 from a supply and exhaust pipe 59, Fig. 10, through the intermediacy of registering or communicating ports or passages 60 and 61 which respectively are provided in the walls of the hollow base 35 of the table supporting column and of the hub of the table surrounding such base.

The closing of the halves of the lower section of parison body mold (and of the halves of the neck ring) may be effected at an appropriate time in the cycle of rotation of the table 38 by applying air under pressure to the cylinder 45 between the retracted pistons 48 and 51. This may be done at the time the parison forming unit reaches the charging station, below and in line with the feeder outlet. A conduit 62 communicates with an internal groove 63 in the wall of the cylindrical bearing 57 and this groove in turn communicates with a radial port 64 that opens into the cylinder 45 between the pistons 48 and 51 when they are retracted. With the structure shown, air is supplied to the conduit 62 at the proper time from a supply and exhaust pipe 65 through the registering or communicating ports or passages 66 and 67 in the supporting column base 35 and the table hub 37.

To effect closing of the halves of the upper section of the inverted parison body mold substantially as hereinbefore described, air under pressure passes from a supply and exhaust pipe 68, Fig. 10, to a groove 69 in the outer periphery of the hollow base 35, thence through a port 70 in the table hub to a conduit 71. The conduit 71 communicates with the interior of the cylinder 45 at the inner end of the latter through an annular groove 72 in the bearing 57 and a radial port 73 in the cylinder 45.

The mechanism shown for raising and lowering the parison mold of each unit comprises a vertical cylinder 74, Fig. 10, a piston 75 therein having its upstanding rod 76 connected at its upper end to a head 77 at the upper end of a vertically movable cylindrical slide carrier 78 which works in an open-topped cylindrical guiding structure 79 on the table 38. The carrier 74 has its head 77 formed integrally with or rigidly connected with the cylindrical bearing 56 in which the cylinder 45 is journalled. When the piston 75 is raised in the cylinder 74, the cylinder 45, together with its cylindrical bearing and the parts carried thereby, including the mold M, will be raised as a unit. When the pressure beneath the piston 75 is reduced or relieved, which may be effected at a predetermined varying rate, the parts supported by the piston 75 will descend therewith. A pin 80 carried by the guiding structure 79 and working in a vertical groove 81 in the movable carrier 78 will prevent accidental rotary displacement of the latter and serve to maintain the mold M accurately in line with the feeder outlet when such mold has been brought to the mold charging station. The structure shown for applying air to the cylinder 74 beneath the piston 75 and for effecting the desired exhaust or relief of such pressure at the proper times includes a conduit 82 which communicates at one end with the bottom part of the cylinder 74 and at its opposite end with a port or passage 83 in the hub of the table 38. When the unit carrying the mold to be charged is at the charging station, its conduit 82 communicates through the port or passage 83 with a port or passage 84 in the supporting column base 35 and, through such port or passage 84 with an air pressure supply and exhaust pipe 85.

Any suitable timing mechanism, such, for example, as a timer of the well known Hartford-Empire I.S. type, may be used to control the application of air under pressure to and the exhaust or relief of such air from the respective pipes 59, 65, 68 and 85 to accomplish the operations and results which hereinbefore have been pointed out.

For reciprocating the neck pin carrier 20 vertically in the manner and at the times hereinbefore indicated, pneumatic mechanism as shown in Fig. 10 may be employed. Such mechanism comprises an upright cylinder 86 within which a vertically reciprocable two-part piston is disposed. This two-part piston comprises an inner piston member or core 87 and an outer hollow piston member or shell 88. The part 87 is slidable in the shell 88 and the latter is slidable in the cylinder 86. The rod 89 of the part 87 extends slidably through aligned openings in upper head portions of the cylinder 86 and outer hollow piston member 88 and carries the neck pin carrier 20. The hollow piston member 88 has ports through its walls communicating with its interior at opposite ends thereof. These ports are in communication with air pressure supply and exhaust pipes 190 and 191, respectively, when the piston member 88 is at the upper end of its stroke in the cylinder 86. The latter is provided with additional air pressure supply and exhaust pipes 192 and 193, respectively, which communicate with the interior thereof at its opposite ends. By suitable regulation of air under pressure to and exhaust of such air from the respective pipes 190, 191, 192 and 193, as by the use of suitable known timing mechanism, the neck pin may be given the vertical movements hereinbefore indicated. Thus, such neck pin may be moved upward to project into the neck ring of the inverted parison mold as soon as the latter reaches the charging station.

Thereafter, as the mold is moved upward, the neck pin may be given a further upward movement, as by applying air to the hollow piston member 88 beneath the lowered piston member 87 therein. When the mold descends toward the position shown in Fig. 10, the neck pin may be given a corresponding downward movement by reversing the movement of the piston member 87 in the raised hollow piston member 88. Finally, the piston members may be moved downward in unison from the position shown in Fig. 10 to withdraw the neck pin from the charged inverted parison mold.

The mechanism shown for inverting and reverting the parison mold during part of a cycle of rotation of the table 38 comprises a bevel gear 90 integral with or fixed to the inner head of the cylinder 45 and in mesh with a bevel gear 91 on a short vertical shaft 92. The shaft 92 is fixed to and carried by a bracket 93 on the top of the bearing 57 for the cylinder 45. The gear 91 and a spur gear 94, which is secured thereto, are loose on the shaft 92. The spur gear 94 meshes with a spur gear segment 95 on the upright shaft portion of the table supporting column during that portion of the cycle of rotation of the table 38 that effects movement of the parison mold of a unit to the charging station and the lateral movement of the charged mold away from such station, as from the station indicated by the position of the unit U—4 in Fig. 9 to the counterblow station indicated by the position of the unit U—2 in the same view.

The engagement of the spur gear 94 with the gear segment 95 will revert and invert each parison mold during the portion of the cycle of rotation of the table 38 above mentioned. The teeth of the segment 95 are of sufficient vertical extent to assure continued mesh of such segment with the spur gear 94 during the vertical movements of the inverted parison mold at the charging station.

After the gear 94 of a unit disengages the gear segment 95, the inner end of the bracket 93 of such unit may ride along a depending flange 96 at the arcuate outer edge of a guiding and stabilizing disk segment 97 on the upper portion of the supporting column during the remainder of the cycle of rotation of the table 38.

The table 38 may be rotated in any suitable known manner and by any suitable known means. As hereinbefore has been pointed out, a blow mold table (not shown) may be associated therewith and the two tables driven in synchronism or at coordinated speeds. The transfer of a parison from each unit on the table 38 to a blow mold on such blow mold table, as at the station indicated by the position of the unit U—3, may be effected in any suitable known or preferred manner and the mechanism employed in conjunction with the blow mold to expand the parison to the final form desired likewise may be of any suitable known construction and mode of operation.

Also, the mechanism and parts which have been described in detail herein may be modified or changed or replaced by equivalent parts, and the steps of the method of the invention may be altered and performed by the use of various instrumentalities without departing from the spirit and scope of such invention.

I claim:

1. In the manufacture of a bottle or a similar article of hollow glassware, the method of forming a parison which comprises intercepting the lower end portion of a descending supply column of viscous glass, shaping such intercepted portion of the glass column to the approximate size and configuration of the open end portion of the article of glassware that is being made, preforming a further portion of the glass column while such further portion is out of contact at its surface with any charge shaping instrumentality by supporting said lower end portion to prevent attenuation of said further portion of the supply column, then laterally supporting and positively shaping the preformed portion of said column to give it the shape of the body of the parison desired, and severing the laterally supported and positively shaped glass from the oncoming glass of the supply column.

2. In the manufacture of a bottle or similar article of hollow glassware, the method of forming a parison which comprises intercepting the lower end portion of a descending supply column of viscous glass, shaping such intercepted portion of the glass column to the approximate size and configuration of the open end portion of the article of glassware that is being made, controlling the downward movement of the intercepted portion of said supply column with relation to the normal rate of descent of the glass of the column to preform a further portion of said column to a shape and size approximating the shape and size of the major portion of the parison desired, then laterally supporting and positively shaping said preformed portion of said column to produce the major portion of the parison desired, and severing the laterally supported glass from the oncoming glass of the supply column.

3. In the manufacture of a bottle or a similar article of hollow glassware, the method of forming a parison which comprises intercepting the lower end portion of a descending supply column of molten glass by the closed lower end portion of an inverted parison mold while maintaining the remainder of the invertion parison mold open and the walls thereof out of contact with glass of the supply column, moving the inverted parison mold downward at a speed predetermined with relation to the normal gravity descent of glass of said column to aid in shaping the portion of the column above the intercepted glass, then closing said previously open remainder of the inverted parison mold to bring the walls thereof into contact with said portion of the column above said intercepted glass, and then severing the glass in said inverted parison mold from said supply column.

4. In the manufacture of a bottle or a similar article of hollow glassware, the method of forming a parison which comprises intercepting the lower end portion of a descending supply column of molten glass by the closed lower end portion of an inverted parison mold while maintaining the remainder of the inverted parison mold open and the walls thereof out of contact with glass of the supply column, moving the inverted parison mold downward at a speed predetermined with relation to the normal gravity descent of glass of said column to aid in shaping the portion of the column above the intercepted glass, then closing said previously open remainder of the inverted parison mold to bring the walls thereof into contact with said portion of the column above said intercepted glass, then giving the mold and the glass therein a further downward movement to attenuate the glass of the column at the upper end of said mold, and severing the glass in the mold from the supply column.

5. In the manufacture of a bottle or a similar article of hollow glassware by the use of a feeder having a downwardly open outlet and a parison mold having separate neck ring and body portions, the method which comprises disposing said parison mold in inverted position in the path of descent of a supply column of glass from said feeder outlet, with the neck ring portion of said parison mold closed and at least a portion of a body of the inverted parison mold open, supporting and shaping the lower end portion of said column of glass in said neck ring, moving said inverted mold and the glass in said neck ring downward at a rate predetermined with relation to the normal descent of glass of said column to aid in shaping a further portion of the column to approximate the size and shape of a substantial part of the body of the parison desired, then closing said previously open portion of the inverted parison mold about said further portion of said glass column to laterally support and positively shape the same, and severing the glass in said inverted parison mold from the glass of said supply column.

6. In the manufacture of a bottle or a similar article of hollow glassware, the method which comprises discharging molten glass downward between open halves of an upper section of an inverted parison mold into the cavity of a closed neck forming portion of said inverted parison mold, forming the neck portion of the article being made in said closed neck forming portion of the parison mold, closing said upper section of the parison mold about the portion of said glass column between said previously open halves thereof, and thereafter severing the glass in said parison mold from the glass of said column.

7. Apparatus for making glass bottles or similar articles of glassware, comprising a feeder having a downwardly opening submerged discharge outlet, a parison mold comprising a neck ring and a parison body mold, said neck ring and said parison body mold comprising parts separable at a plane extending longitudinally of said parison mold, means for moving said parison mold in inverted position vertically in line with and toward said outlet with said neck ring closed and a substantial portion of the parison mold body open, means for forming the lower end portion of a column of glass descending from said outlet in said closed neck ring to form the neck portion of the article desired while glass of a further portion of the column is disposed within but out of contact with the walls of said open portion of the body of the inverted parison mold, means for closing said open portion of the body of the inverted parison mold to shape by contact with the walls thereof, the glass of said further portion of said column, means for lowering said inverted parison mold and the glass therein to attenuate a portion of the glass column at the upper end of said mold, and means for severing said attenuated portion of said column.

8. Apparatus for making bottles and similar articles of glassware comprising the combination with a glass feeder having a submerged downwardly opening discharge outlet, of a parison mold, said parison mold comprising separate neck ring and body portions, said body portion of the parison mold being adapted to be opened and closed for at least a substantial part of its length independently of the closing and opening of said neck ring, means for bringing said parison mold in inverted position to a charging station beneath said feeder outlet, means for raising said inverted parison mold toward the outlet with said substantial portion of the body of the parison mold open until the lower end portion of a column of glass descending from said outlet is received and supported by said neck ring, means for lowering said inverted parison mold while said substantial portion of the body thereof is open and out of contact with the glass column until a portion of said glass column above that supported by said neck ring has been preformed to a size and general shape appropriate for the interior of said open portion of the body of the parison mold, means for closing said previously open portion of the body of the parison mold about said preformed portion of said glass column, and means for severing the glass in said parison mold from the oncoming glass of said column.

9. Apparatus for making bottles and similar articles of glassware comprising the combination with a glass feeder having a submerged downwardly opening discharge outlet, of a parison mold, said parison mold comprising separate neck ring and body portions, said body portion of the parison mold being adapted to be opened and closed for at least a substantial part of its length independently of the closing and opening of said neck ring, means for bringing said parison mold in inverted position to a charging station beneath said feeder outlet, means for raising said inverted parison mold toward the outlet with said substantial portion of the body of the parison mold open until the lower end portion of a column of glass descending from said outlet is received and supported by said neck ring, means for lowering said inverted parison mold with said substantial portion of the body thereof open and out of contact with the glass column until a portion of said glass column has been preformed to a size and general shape appropriate for the interior of said open portion of the body of the parison mold, means for closing said previously open portion of the body of the parison mold about said preformed portion of said glass column, means for severing the glass in said parison mold from the oncoming glass of said column, and means for reverting said parison mold and the glass therein and for moving it laterally out of line with said outlet.

10. Apparatus for making glass bottles and similar articles of hollow glassware comprising the combination with a glass feeder having a downwardly opening submerged outlet from which glass tends to issue in a descending column, a parison mold comprising a neck ring and a parison body mold, said neck ring comprising separable halves and said parison body mold comprising cooperative transversely divided sections, each comprising separable halves, the line of division of said sections being located at approximately the plane at which the interior of the parison body mold begins to taper to the size of the interior of the neck ring, means for supporting and operating said parison mold to raise it in inverted position beneath and in line with said discharge outlet and with the halves of the upper section of the parison body mold open until the lower end portion of a column of glass descending from said outlet is received within and supported by said neck ring and the lower section of the body of the inverted parison mold, means for moving said inverted parison mold and the glass therein downward until the glass between the halves of the upper section of the body of the inverted parison mold has attained a predetermined size and shape means for then closing the halves of said upper section of the body of the inverted parison mold, and means for thereafter severing the glass within said inverted parison mold from the oncoming glass of said column.

11. Apparatus for making bottles and similar articles of glassware comprising the combination with a submerged glass discharge outlet from which glass of a supply body tends to issue in a descending column, of an inverted parison mold disposed below and in line with said outlet, said parison mold comprising a neck ring and parison body mold portions, said parison body mold portion comprising transversely divided upper and lower sections, each comprising separable halves, means for maintaining the halves of the upper section of the body of the inverted parison mold open and the halves of the lower section of the body of the inverted parison mold and the neck ring portion thereof closed during the descent of the lower end portion of a column of glass from said outlet into said closed portion of the inverted parison mold, means for forming the glass in said neck ring into the neck portion of the article desired while the halves of the upper section of the body of the inverted parison mold are open, means for thereafter closing said halves of the upper section of the body of the parison mold about a further portion of said glass column, and means for severing the glass in said parison mold from the oncoming glass of said column.

12. Apparatus for making bottles and similar articles of hollow glassware comprising a glass feeding container having a downwardly projecting tubular nozzle from which glass of a supply body in the container tends to issue in a descending column, a vertically movable inverted parison mold beneath and in line with said outlet, said inverted parison mold having a body portion adapted to be opened from its upper end for at least part of its length to overlap said depending nozzle when said inverted parison mold has been raised toward the outlet until the lower end portion of a column of glass descending from said outlet enters and is supported and shaped by the closed remainder of the inverted parison mold, means for lowering said inverted parison mold and the glass therein until the open portion of the body of the parison mold is below the plane of the lower end of said nozzle, means for thereafter closing said open portion of the body of the parison mold, and means for severing the glass in said parison mold from said column.

13. Apparatus for making bottles and similar articles of hollow glassware, comprising a rotary table, a plurality of parison forming units thereon, each comprising a parison mold adapted when the table is rotated to be brought in turn to a position below and in line with a downwardly opening discharge outlet of a glass feeder, said parison mold comprising a plurality of transversely divided sections, each comprising separable halves, means for inverting said parison mold as it is brought by the rotation of said table to a position below and in line with said outlet, means for raising the inverted parison mold in line with the outlet with the halves of the upper section thereof open and the remainder of the mold closed, means for lowering said inverted parison mold after glass of a column descending from said outlet has entered and is supported within the closed portion of said mold, means for thereafter closing the halves of said upper section of the inverted parison mold, means for severing the glass in said inverted parison mold from the supply column, and means for reverting said mold and the glass therein as the rotation of said table moves said mold laterally out of line with said outlet.

14. Apparatus for making bottles and similar articles of hollow glassware, comprising a rotary table, a plurality of parison forming units thereon, each comprising a parison mold adapted when the table is rotated to be brought in turn to a position below and in line with a downwardly opening discharge outlet of a glass feeder, said parison mold comprising a plurality of transversely divided sections, each comprising separable halves, means for inverting said parison mold as it is brought by the rotation of said table to a position below and in line with said outlet, means for raising the inverted parison mold in line with the outlet with the halves of the upper section thereof open and the remainder of the mold closed, means for lowering said inverted parison mold after glass of a column descending from said outlet has entered and is supported within the closed portion of said mold, means for thereafter closing the halves of said upper section of the inverted parison mold, means for severing the glass in said inverted parison mold from the supply column, means for reverting said mold and the glass therein as the rotation of said table moves said mold laterally out of line with said outlet, a neck pin disposed below and in line with said inverted parison mold when the latter is in line with said outlet, and means for moving said neck pin vertically to project it into the lower portion of said inverted parison mold when the latter is in its lowered position for giving said neck pin a further vertical movement with said mold as the latter is raised and lowered, and for thereafter lowering said neck pin to withdraw it from said mold.

LLOYD G. BATES.